US009934721B2

(12) United States Patent
An et al.

(10) Patent No.: US 9,934,721 B2
(45) Date of Patent: Apr. 3, 2018

(54) ORGANIC LIGHT EMITTING DISPLAY DEVICE AND METHOD FOR DRIVING THE SAME

(71) Applicant: Samsung Display Co., Ltd., Yongin, Gyeonggi-do (KR)

(72) Inventors: Bo Young An, Hwaseong-si (KR); Ho Suk Maeng, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 216 days.

(21) Appl. No.: 14/341,704

(22) Filed: Jul. 25, 2014

(65) Prior Publication Data

US 2015/0255016 A1 Sep. 10, 2015

(30) Foreign Application Priority Data

Mar. 10, 2014 (KR) ........................ 10-2014-0027828

(51) Int. Cl.

| | |
|---|---|
| ***G06F 3/038*** | (2013.01) |
| ***G09G 3/3233*** | (2016.01) |
| ***G09G 3/3225*** | (2016.01) |

(52) U.S. Cl.

CPC ......... *G09G 3/3233* (2013.01); *G09G 3/3225* (2013.01); *G09G 2310/0221* (2013.01); *G09G 2310/0283* (2013.01); *G09G 2320/0271* (2013.01); *G09G 2320/0686* (2013.01); *G09G 2330/021* (2013.01); *G09G 2340/16* (2013.01); *G09G 2360/16* (2013.01)

(58) Field of Classification Search

CPC ... G09G 2310/0262; G09G 2310/0278; G09G 2320/0233; G09G 3/3233

USPC ........................... 345/211; 348/556; 381/107

See application file for complete search history.

(56) References Cited

U.S. PATENT DOCUMENTS

2006/0087588 A1* 4/2006 Cok .................... G09G 3/3216 348/556
2010/0310094 A1* 12/2010 Lee ..................... G09G 3/3233 381/107
2014/0267091 A1* 9/2014 Kim ..................... G06F 1/1652 345/173

FOREIGN PATENT DOCUMENTS

KR 10-2011-0055259 A 5/2011
KR 10-2012-0038334 A 4/2012
KR 10-2013-0067629 A 6/2013

* cited by examiner

*Primary Examiner* — Kumar Patel
*Assistant Examiner* — Kuo Woo
(74) *Attorney, Agent, or Firm* — Lewis Roca Rothgerber Christie LLP

(57) ABSTRACT

Provided is an organic light emitting display device including: a display unit having a first display region and a second display region, and comprising a plurality of pixels; and a controller configured to calculate an OPR (On Pixel Ratio) of the plurality of pixels from video data input from an outside, and to generate corrected video data for decreasing driving current of the plurality of pixels based on the OPR, the OPR including a first OPR that corresponds to the first display region and a second OPR that corresponds to the second display region.

18 Claims, 13 Drawing Sheets

ORGANIC LIGHT EMITTING DISPLAY DEVICE AND METHOD FOR DRIVING THE SAME

CROSS-REFERENCE TO RELATED APPLICATION

This application claims priority to and the benefit of Korean Patent Application No. 10-2014-0027828, filed on Mar. 10, 2014 in the Korean Intellectual Property Office, the disclosure of which is incorporated herein in its entirety by reference.

BACKGROUND

1. Field

Aspects of example embodiments of the present invention relate to an organic light emitting display device and a method for driving the same, and more particularly to a flexible organic light emitting display device and a method for driving the same.

2. Description of the Prior Art

Display devices are used as displays of portable information terminals, such as a personal computer, a portable phone, and a PDA, or monitors of various kinds of information appliances. Recently, various kinds of light emitting display devices, which are light-weight and small-sized in comparison to a cathode ray tube (CRT), have been developed, and in particular, organic light emitting display devices having the features of high light emitting efficiency, high luminance, prominent viewing angle, and quick response speeds are in the spotlight.

As the organic light emitting display device displays a high-luminance image, the driving voltage thereof may be increased, and this may cause power consumption to be increased. To supplement this, an automatic current limit (ACL) technology, which adjusts power consumption through changing of brightness according to the amount of information displayed on the organic light emitting display device, has been developed. That is, the automatic current limit (ACL) technology can reduce the power consumption through correction to decrease the luminance if video data has high luminance.

SUMMARY

In the case where separate images are displayed on the first display region and the second display region of the flexible organic light emitting display device, the respective regions may have different luminance distribution. Further, even if a continuous image is displayed on the first display region and the second display region in association with each other, the respective regions may have different viewing angles according to the shapes of bent portions and different luminance values recognized by a user through light refraction. Accordingly, the automatic current limit (ACL) function may be applied separately to the first display region and the second display region.

Accordingly, one according to embodiments of the present invention is to provide an organic light emitting display device, which can reduce power consumption more effectively by separately applying an automatic current limit to a first display region and a second display region that are divided through bending.

Another feature according to embodiments of the present invention is to provide a method for driving an organic light emitting display device, which can reduce power consumption more effectively by separately applying an automatic current limit to a first display region and a second display region that are divided through bending.

Additional features and aspects of the present invention will be set forth in part in the description which follows and in part will become apparent to those having ordinary skill in the art upon examination of the following or may be learned from practice of the invention.

According to an embodiment of the present invention, there is provided an organic light emitting display device including: a display unit having a first display region and a second display region, and comprising a plurality of pixels; and a controller configured to calculate an OPR (On Pixel Ratio) of the plurality of pixels from video data input from an outside, and to generate corrected video data for decreasing driving current of the plurality of pixels based on the OPR, the OPR including a first OPR that corresponds to the first display region and a second OPR that corresponds to the second display region.

The controller may be configured to correct the video data that corresponds to the first display region utilizing a first corrected luminance value calculated according to the first OPR, and to correct the video data that corresponds to the second display region utilizing a second corrected luminance value calculated according to the second OPR.

The controller may be configured to calculate a third OPR that is an average value between the first OPR and the second OPR, and to correct the video data that corresponds to a third region that is a boundary region between the first display region and the second display region utilizing a third corrected luminance value calculated according to the third OPR.

The controller may be configured to calculate a third OPR that is an average value between the first OPR and the second OPR, to calculate a third corrected luminance value based on the third OPR, and to correct the video data that corresponds to the first display region and the second display region utilizing the third corrected luminance value.

The controller may be configured to correct the video data that corresponds to the first display region and the second display region utilizing a first corrected luminance value calculated according to the first OPR.

The controller may be configured to correct the video data that corresponds to the first display region utilizing a first corrected luminance value calculated according to the first OPR.

The controller may be configured to correct the video data that corresponds to the second display region utilizing a second corrected luminance value calculated according to the second OPR.

The second display region may extend from at least one side of the display region, and may be bent with a curvature or may be bent based on a boundary surface between the first display region and the second display region.

The controller may be configured to generate the corrected video data from the video data when a gradation level of the video data is equal to or higher than a reference gradation level.

The controller may include: a data converter configured to convert the video data into the corrected video data, the data converter including an OPR calculator configured to calculate the first OPR and the second OPR that respectively correspond to the first display region and the second display region from the video data; a corrected luminance value calculator configured to calculate a first corrected luminance value and a second corrected luminance value based on the first OPR and the second OPR, respectively; and a corrected video data generator configured to correct the video data to the corrected data utilizing the first corrected luminance value and the second corrected luminance value.

The controller may be configured to calculate the OPR from the video data of a current frame, and to correct the video data of the current frame or the video data of a next frame based on the OPR.

According to another embodiment of the present invention, there is provided a method for driving an organic light emitting display device including a display unit having a first display region and a second display region, and comprising a plurality of pixels, the method including: generating an OPR (On Pixel Ratio) of the plurality of pixels from video data input from an outside, the OPR comprising a first OPR that corresponds to the first display region and a second OPR that corresponds to the second display region; and generating corrected video data for decreasing driving current of the plurality of pixels based on the OPR.

The generating of the corrected video data may include: calculating a corrected luminance value based on the OPR; and correcting the video data to the corrected video data utilizing the corrected luminance value.

The generating of the corrected video data may include correcting the video data that corresponds to the first display region utilizing a first corrected luminance value calculated according to the first OPR, and correcting the video data that corresponds to the second display region utilizing a second corrected luminance value calculated according to the second OPR to generate the corrected video data.

The generating of the OPR may include calculating a third OPR that is an average value between the first OPR and the second OPR, and the generating of the corrected video data may include correcting the video data that corresponds to a third display region that is a boundary region between the first display region and the second display region utilizing a third corrected luminance value calculated according to the third OPR to generate the corrected video data.

The generating of the OPR may include calculating a third OPR that is an average value between the first OPR and the second OPR, and the generating of the corrected video data may include correcting the video data that corresponds to the first display region and the second display region utilizing a third corrected luminance value calculated according to the third OPR to generate the corrected video data.

The generating of the corrected video data may include correcting the video data that corresponds to the first display region and the second display region utilizing a first corrected luminance value calculated according to the first OPR to generate the corrected video data.

The generating of the corrected video data may include correcting the video data that corresponds to the first display region utilizing a first corrected luminance value calculated according to the first OPR to generate the corrected video data.

The generating of the corrected video data may include correcting the video data that corresponds to the second display region utilizing a second corrected luminance value calculated according to the second OPR to generate the corrected video data.

The generating of the corrected video data may include generating the corrected video data from the video data when a gradation level of the video data is equal to or higher than a reference gradation level.

According to aspects of the present invention, since the automatic current limit function is separately applied to the first display region and the second display region, the power consumption can be reduced more effectively.

The aspects of the present invention are not limited to the contents as described in the example embodiments above, but further various aspects are included in the description.

BRIEF DESCRIPTION OF THE DRAWINGS

The above and other features and aspects of the present invention will be more apparent from the following detailed description taken in conjunction with the accompanying drawings, in which.

DETAILED DESCRIPTION

Figure 1:
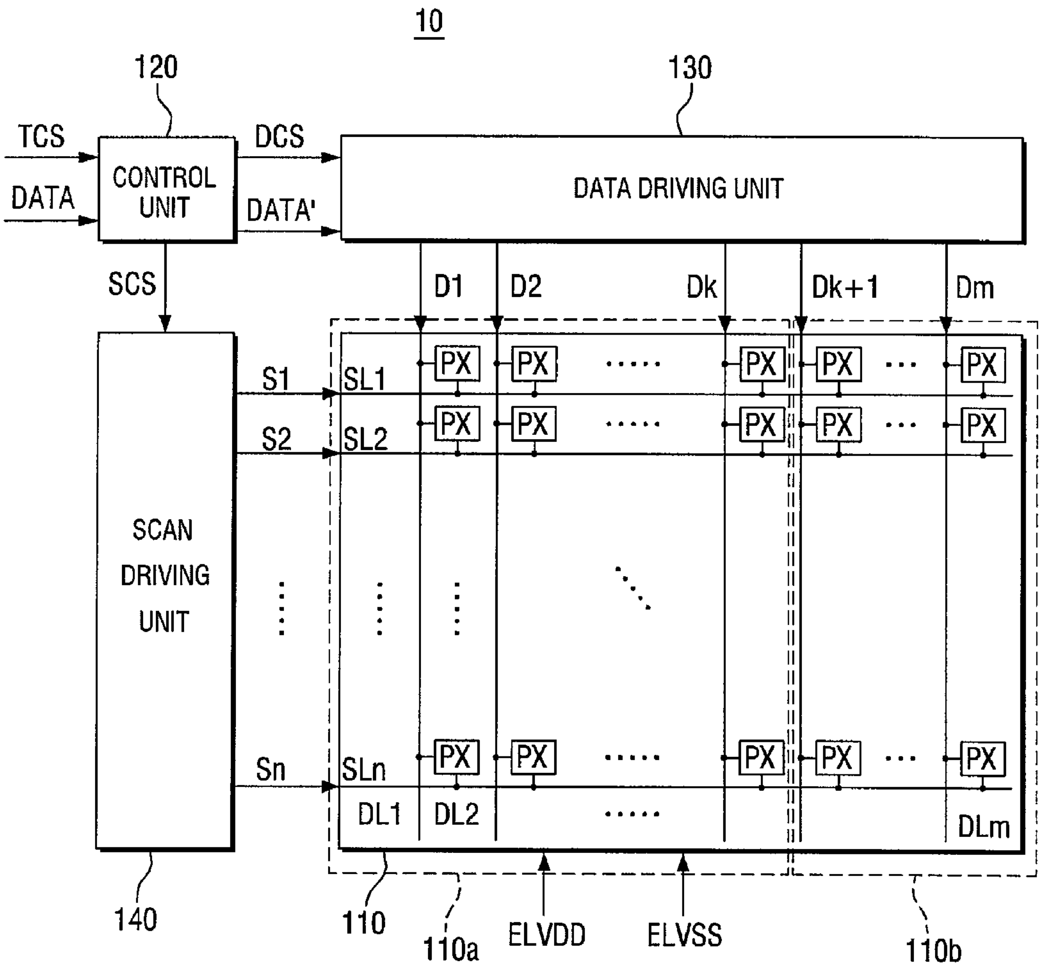
FIG. 1 is a block diagram of an organic light emitting display device according to an embodiment of the present invention.

The aspects and features of the present invention and methods for achieving the aspects and features will be apparent by referring to the embodiments herein, that are described in detail with reference to the accompanying drawings. However, the present invention is not limited to the embodiments disclosed hereinafter, and can be implemented in various forms. The matters defined and described in the description, such as the detailed construction and elements, are nothing but example embodiments provided to assist those of ordinary skill in the art to understand the spirit and scope of the invention, and the present invention is defined by the scope of the appended claims, and their equivalents.

Throughout this specification and the claims that follow, when an element or layer is described as "on" another element or layer, the element or layer may be "directly on" the other element or layer, or one or more intervening elements or layers may be present. When an element is described as "coupled" or "connected" to another element, the element may be "directly coupled" or "directly connected" to the other element, or "indirectly coupled" or "indirectly connected" to the other element through one or more intervening elements. In the entire description that follows, the same drawing reference numerals refer to the same elements across the various figures.

Although the terms "first, second, and so forth" are used to describe diverse constituent elements, such constituent elements are not limited by these terms. These terms are used only to discriminate a constituent element from other constituent elements. Accordingly, in the following description, a first constituent element may be a second constituent element.

The organic light emitting display device may be applied to a thin flexible substrate, such as plastic, and thus may be implemented as a flexible organic light emitting display device. The flexible organic display device is divided into a first display region and a second display region based on a bent region. The first display region and the second display region of the flexible organic light emitting display device may display separate images or a continuous image in association with each other.

Hereinafter, example embodiments of the present invention will be described in detail with reference to the accompanying drawings.

Figure 2:
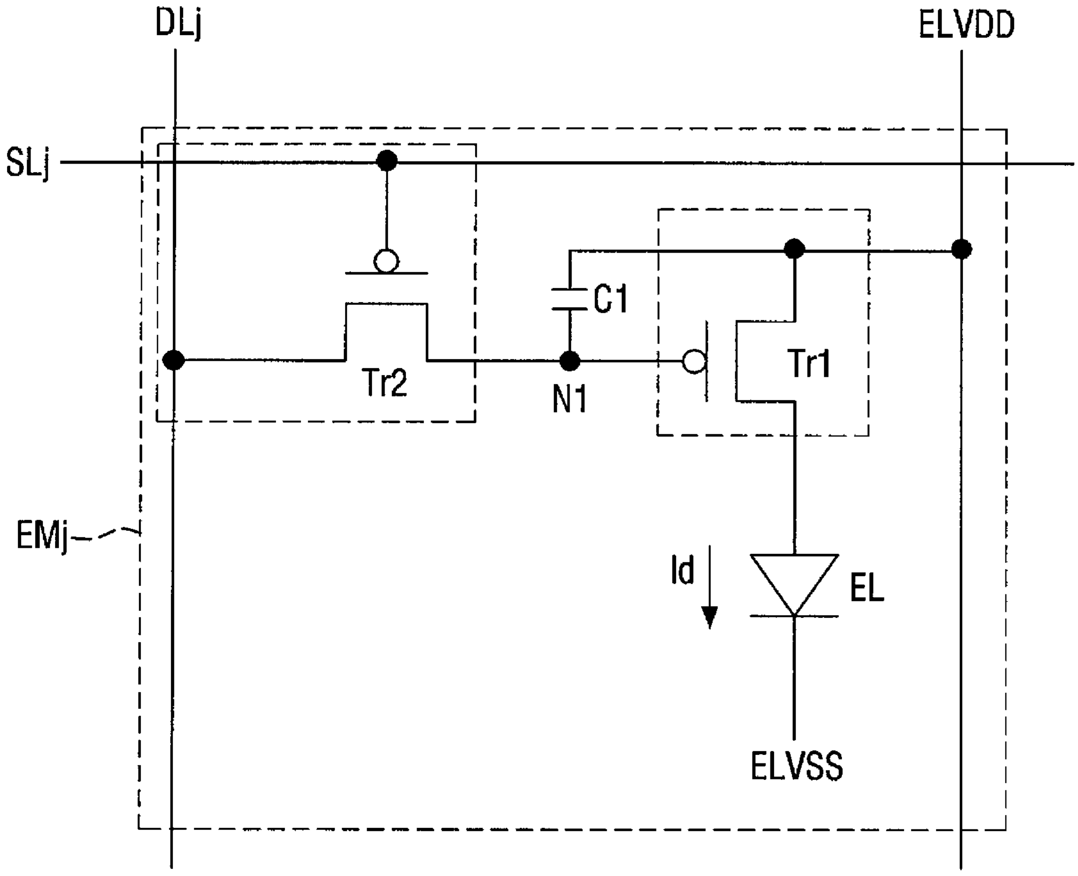
FIG. 2 is a circuit diagram of a pixel according to an embodiment of the present invention.

FIG. 1 is a block diagram of an organic light emitting display device according to an embodiment of the present invention, and FIG. 2 is a circuit diagram of a pixel according to an embodiment of the present invention. FIGS. 3 to 6 are perspective views schematically illustrating a display unit according to embodiments of the present invention.

Referring to FIGS. 1 to 6, a display device 10 includes a display unit 110, a control unit 120 (e.g., a controller), a data driving unit 130 (e.g., a data driver), and a scan driving unit 140 (e.g., a scan driver).

The display unit 110 may be a region where an image is displayed. The display unit 110 may include a plurality of scan lines SL1 to SLn, a plurality of data lines DL1 to DLm that cross the plurality of scan lines SL1 to SLn, and a plurality of pixels PX each of which is connected to one of the plurality of scan lines SL1 to SLn and one of the plurality of data lines DL1 to DLm. The plurality of scan lines SL1 to SLn may extend in a first direction D1, and may be substantially in parallel with each other. The plurality of scan lines SL1 to SLn may include first to n-th scan lines SL1 to SLn that are arranged in order. The plurality of data lines DL1 to DLm may cross the plurality of scan lines SL1 to SLn. That is, the plurality of data lines DL1 to DLm may extend in a second direction D2 that is perpendicular or substantially perpendicular to the first direction D1, and may be substantially in parallel with each other. Here, the first direction D1 may correspond to a row direction, and the second direction D2 may correspond to a column direction. Data voltages D1 to Dm may be applied to the plurality of data lines DL1 to DLm. The plurality of pixels PX may be arranged in a matrix form, but are not limited thereto. Each of the plurality of pixels PX may be connected to one of the plurality of scan lines SL1 to SLn and one of the plurality of data lines DL1 to DLm. The plurality of pixels PX may receive the data voltages D1 to Dm that are applied to the data lines DL1 to DLm corresponding to scan signals S1 to Sn provided from the scan lines SL1 to SLn. Further, the plurality of pixels PX may be connected to a first power line and a second power line, and may receive a first power voltage ELVDD through the first power line and a second power voltage ELVSS through the second power line.

Here, each of the plurality of pixels PX may include at least one organic light emitting element EM.

As illustrated in FIG. 2, the j-th organic light emitting element EMj may include a first thin film transistor Tr1, a second thin film transistor Tr2, and an organic light emitting diode EL. However, the present invention is not limited thereto, and the configuration of the organic light emitting element is not limited to that as illustrated in FIG. 2. Here, the j-th organic light emitting element EMI may be an organic light emitting element included in any one pixel PXj of the plurality of pixels PX. The first thin film transistor Tr1 may drive an organic light emitting diode EL, and the second thin film transistor Tr2 may control the first thin film transistor Tr1. Here, a gate terminal of the second thin film transistor Tr2 may be connected to the j-th scan line SLj, a source terminal of the second thin film transistor Tr2 may be connected to the j-th data line DLj, and a drain terminal of the second thin film transistor Tr2 may be connected to a first node N1. The second thin film transistor Tr2 may be turned on by a scan signal Sj that is applied to the j-the scan line SLj to be conducted with the j-th data line DLj. Here, data voltage Dj may be applied through the j-th data line DLj. The data voltage Dj may be applied from the source terminal of the second thin film transistor Tr2 to the first node N1 through the drain terminal, and may be transferred to a first capacitor C1 and a gate terminal of the first thin film transistor Tr1. That is, the voltage level of the data voltage Dj may be equal to the voltage level at the first capacitor C1 and the gate terminal of the first thin film transistor Tr1.

One end of the first capacitor C1 may be connected to the first node N1, and the other end thereof may be connected to the first power line. If the second thin film transistor Tr2 is in an off state (e.g., an unselected state), the first capacitor C1 may maintain the gate voltage of the first thin film transistor Tr1.

The gate terminal of the first thin film transistor Tr1 may be connected to the first node N1, the first power voltage ELVDD may be input to the source terminal of the first thin film transistor Tr1, and the drain terminal of the first thin film transistor Tr1 may be connected to one end of the organic light emitting diode EL. The other end of the organic light emitting diode EL may be connected to the second power voltage ELVSS. The first power voltage ELVDD may be a driving voltage, and the second voltage ELVSS may be a base voltage such as ground voltage. The amount of current Id that flows through a channel of the first thin film transistor Tr1 may be determined according to the electric potential difference between the first power voltage ELVDD and the data voltage Dj, and the amount of light emitted from the organic light emitting diode EL may be determined according to the amount of current Id.

The control unit 120 may calculate an OPR (On Pixel Ratio) of a plurality of pixels PX from received video data DATA, and may generate corrected video data DATA' for decreasing the driving current Id of the plurality of pixels PX based on the OPR. That is, the control unit 120 may decrease the luminance value of the video data to decrease the driving current Id of the plurality of pixels PX that emit light.

Further, the control unit 120 may receive an input of a timing control signal TCS from an external system, and may generate a scan control signal SCS for controlling the scan driving unit 140 and a data control signal DCS for controlling the data driving unit 130. The timing control signal TCS may include a vertical sync signal Vsync, a horizontal sync signal Hsync, a data enable signal DE, and a clock signal CLK. Further, the control unit 120 may receive the video data DATA from the external system.

Here, the display unit 110 may include a first display region 110*a* and a second display region 110*b*. The first display region 110*a* and the second display region 110*b* may be regions at which an image is displayed. That is, the first display region 110*a* and the second display region 110*b* may include a plurality of pixels PX that are arranged in the form of a matrix. The first display region 110*a* may be substantially flat, and the second display region 110*b* may extend from at least one side of the first display region 110*a* and may be adjacent to (e.g., positioned in continuation with) the first display region 110*a*.

Figure 3:
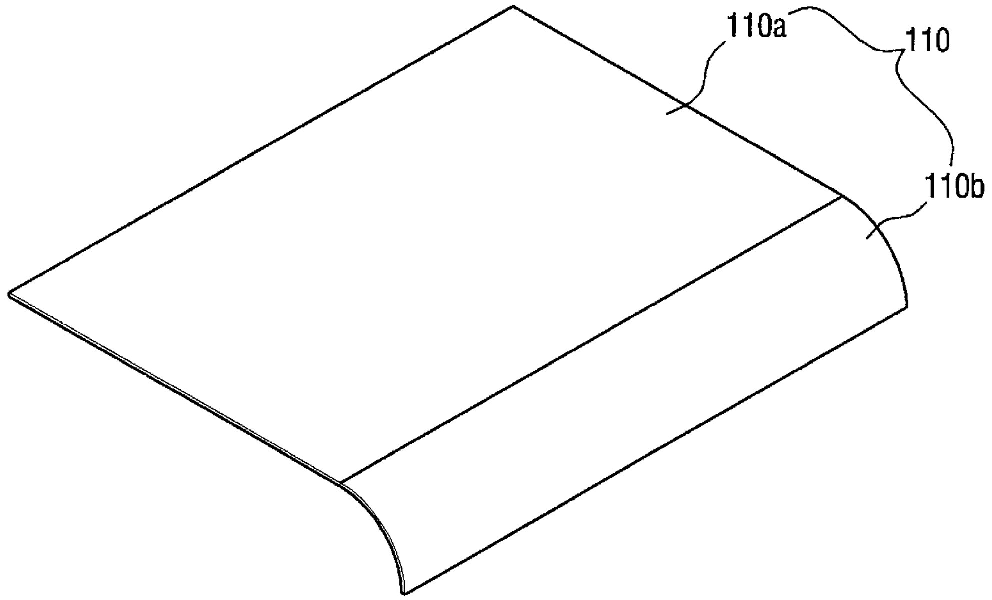
FIGS. 3 to 6 are perspective views schematically illustrating a display unit according to embodiments of the present invention.
Figure 4:
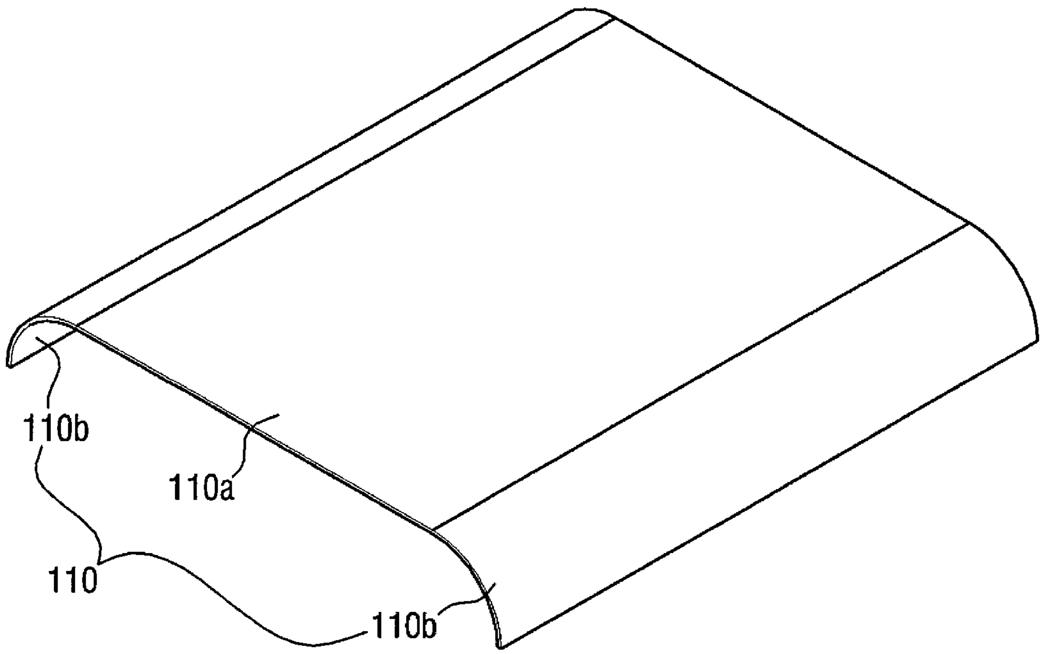
Figure 5:
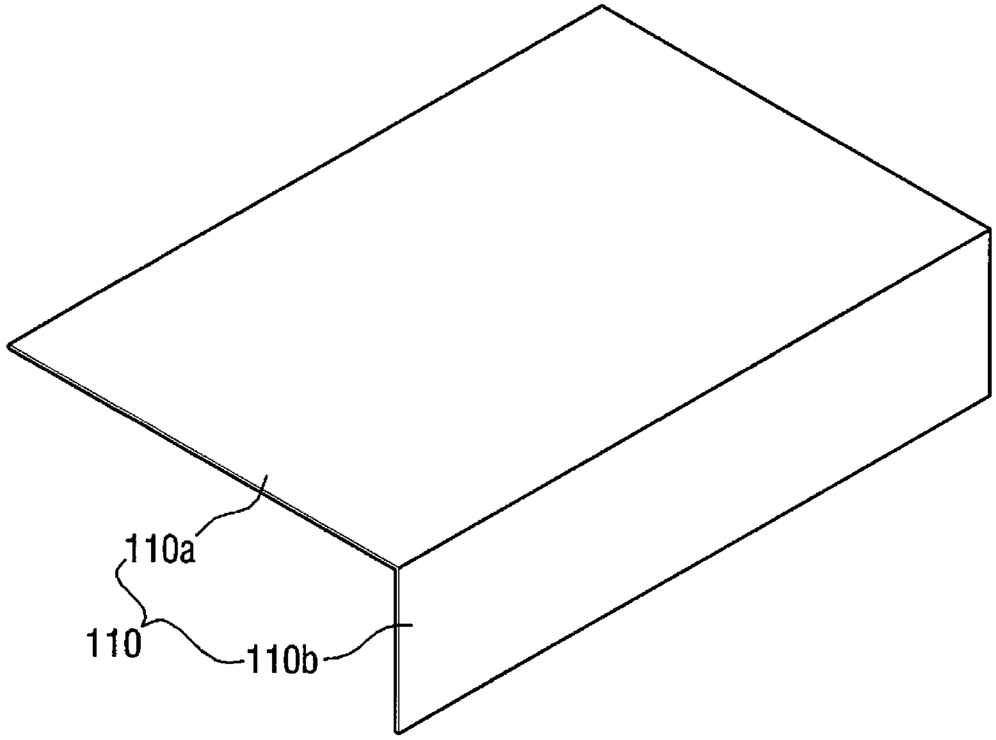
Figure 6:
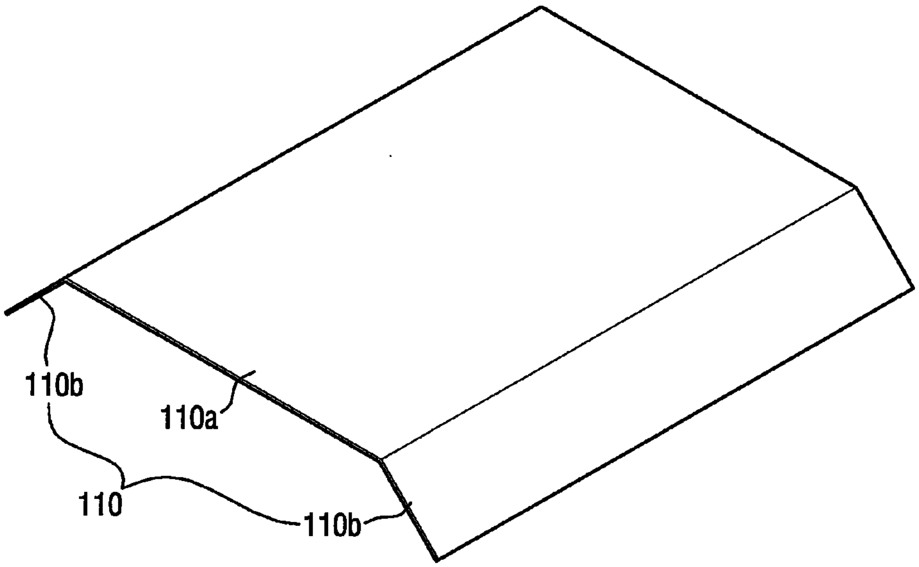

Here, the first display region 110*a* and the second display region 110*b* may be regions that are defined by bending of the organic light emitting display device. In an embodiment of the present invention, the second display region 110*b* may be in a bent state having a curvature (e.g., a predetermined curvature). That is, as illustrated in FIG. 3, the second display region 110*b* may extend from one side of the first display region 110*a* to be bent, and as illustrated in FIG. 4, the second display region 110*b* may extend from both sides of the first display region 110*a* and may be bent to face each other. However, the present invention is not limited thereto. For example, in another embodiment the second display region 110*b* may also be substantially flat and may be bent based on a boundary surface between the first display region 110*a* and the second display region 110*b*. That is, as illustrated in FIG. 5, the second display region 110*b* that is flat may be folded based on one boundary surface at one side of the first display region 110*a*, and as illustrated in FIG. 6, the second display region 110*b* that is flat may be folded on the basis of both boundary surfaces at opposite sides of the first display region 110*a* to face each other.

Here, the first display region 110*a* and the second display region 110*b* may display separate images. Further, the first display region 110*a* may be a main display region that provides a main image on which eyes of a user of the organic light emitting display device 10 are fixed, and the second display region 110*b* may be an auxiliary display region that provides an image supplementing the image displayed on the main display region. That is, the first display region 110*a* and the second display region 110*b* provide different images, and thus different correction values for decreasing the driving current Id are applied to the respective display regions. Further, although the first display region 110*a* and the second display region 110*b* may display one image in association with each other, the luminance recognized by the user may differ depending on the respective display regions due to the viewing angle and light refraction. Even in this case, different correction values for decreasing the driving current Id may be applied to the respective display regions. In the described embodiments, the control unit 120 may calculate a first OPR OPR1 that corresponds to the first display region 110*a* and a second OPR OPR2 that corresponds to the second display region 110*b*, and thus, may generate corrected video data in which different correction values are applied to the first display region 110*a* and the second display region 110*b*. This will be hereinafter described in more detail with reference to FIGS. 7 to 9.

Figure 7:
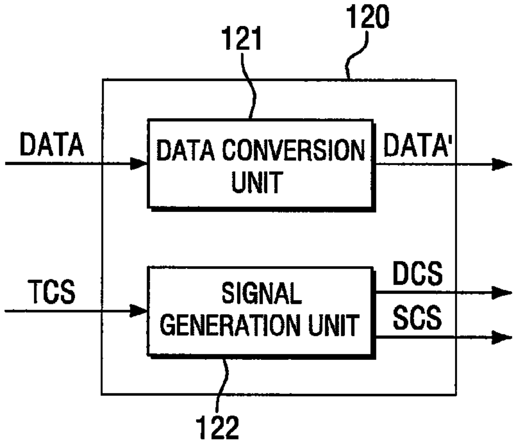
FIG. 7 is a block diagram of a control unit according to an embodiment of the present invention.
Figure 8:
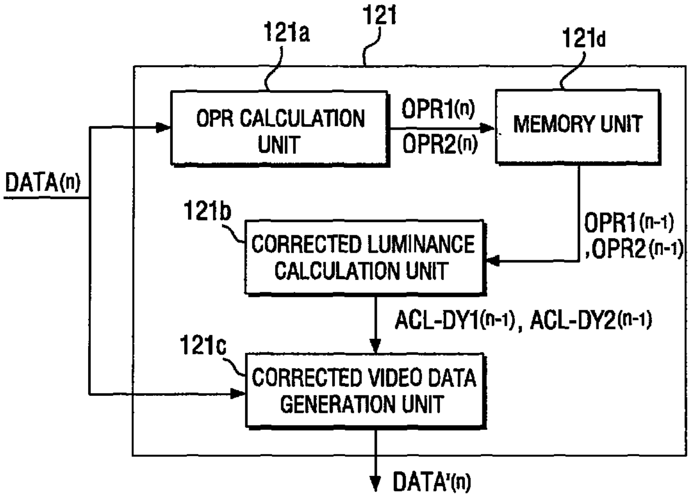
FIG. 8 is a block diagram of a data conversion unit according to an embodiment of the present invention.
Figure 9:
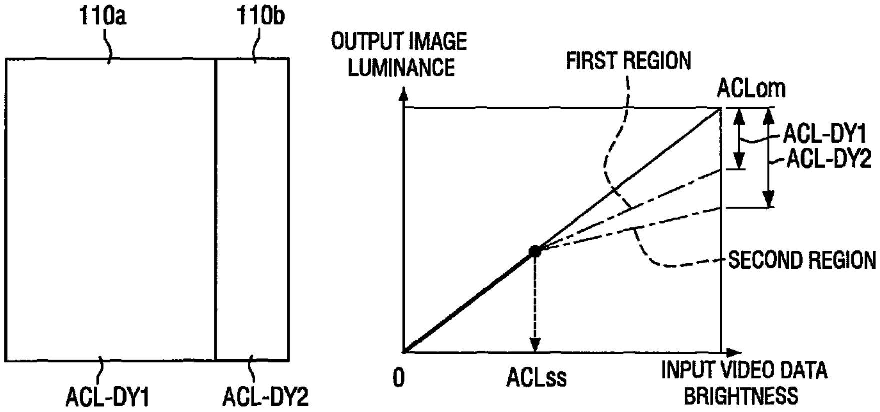
FIG. 9 is a graph illustrating luminance decrease effect according to respective display regions.

FIG. 7 is a block diagram of a control unit according to an embodiment of the present invention, and FIG. 8 is a block diagram of a data conversion unit according to an embodiment of the present invention. FIG. 9 is a graph illustrating luminance decrease effect according to respective display regions.

Referring to FIGS. 7 to 9, the control unit 120 (e.g., controller) includes a data conversion unit 121 (e.g., a data converter) and a signal generation unit 122 (e.g., a signal generator).

The signal generation unit 122 may receive the timing control signal TCS, and may generate the scan control signal SCS for controlling the scan driving unit 140 and the data control signal DCS for controlling the data driving unit 130. The timing control signal TCS may include the vertical sync signal Vsync, the horizontal sync signal Hsync, the data enable signal DE, and the clock signal CLK. The data control signal DCS may include, for example, a source start pulse SSP and a source sampling clock SSC. The scan control signal SCS may include a gate start pulse GSP and a gate sampling clock GSC.

The data conversion unit 121 may receive external video data DATA. The data conversion unit 121 may generate corrected video data DATA' through correction of the video data DATA, so as to decrease the driving current Id of the plurality of pixels PX.

Here, the data conversion unit 121 may generate the corrected video data DATA' in which luminance is decreased in a state where the video data DATA has luminance that is equal to or higher than specific reference luminance. That is, the data conversion unit 121 may generate the corrected video data DATA' when the gradation level of the video data DATA is equal to or higher than a reference gradation level ACLss. Here, the luminance decrease of high-luminance video data may cause a decrease effect of the driving current Id, and the user may not recognize the change of the display quality according to the luminance decrease. That is, substantially the same display quality can be provided while the power consumption is decreased. However, as for a low-luminance image, the power consumption reduction effect according to the luminance decrease is not high, but the deterioration of the display quality may be relatively large with respect to the luminance decrease. Accordingly, the date conversion unit 121 may generate the corrected video data DATA' in the case where the gradation level of the video data is equal to or higher than the reference gradation level ACLss.

The data conversion unit 121 may include an OPR calculation unit 121*a* (e.g., an OPR calculator), a corrected luminance value calculation unit 121*b* (e.g., a corrected luminance value calculator), a corrected video data generation unit 121*c* (e.g., a corrected video data generator), and a memory unit 121*d*.

The OPR calculation unit 121*a* may receive an input of video data DATA(n) of the current frame, and may calculate the OPR of the plurality of pixels PX using the input video data DATA(n). Here, the OPR may be a ratio of the number of pixels that are activated in an on state to the total number of pixels based on one frame. That is, the OPR calculation unit 121*a* may determine the on/off state of each pixel by a digital signal, and calculate the OPR OPR(n) of the current frame by adding the total number of pixels activated in an on state. Here, the OPR calculation unit 121*a* may calculate a first OPR OPR1 that corresponds to the first display region 110*a* and a second OPR OPR2 that corresponds to the second display region 110*b*. That is, the first OPR OPR1 may be the ratio of the number of pixels that are activated in an on state in the first display region 110*a* to the total number of pixels PX included in the first display region 110*a*. The second OPR OPR2 may be the ratio of the number of pixels that are activated in an on state in the second display region 110*b* to the total number of pixels PX included in the second display region 110*b*. The OPR calculation unit 121*a* according to an embodiment of the present invention may calculate a first OPR OPR1(n) of the current frame and a second OPR OPR2(n) of the current frame from the video data DATA(n) of the input current frame, and provide the calculated first OPR OPR1(n) and the second OPR OPR2(n) to the memory unit 121*d*.

The memory unit 121*d* may store the first OPR OPR1(n) of the current frame and the second OPR OPR2(n) of the current frame, and concurrently (e.g., at the same time), provide the first OPR OPR1(n−1) of the previous frame and the second OPR OPR2(n−1) of the previous frame to the corrected luminance value calculation unit 121*b*.

The corrected luminance value calculation unit 121*b* may determine an ACL step (N) based on the OPR. The corrected luminance value calculation unit 121*b* may include a lookup table for the ACL step (N) according to the OPR value, and output the ACL step (N) according to the input OPR. The determined ACL step (N) may be equal to or higher than the reference gradation level ACLss and equal to or lower than the maximum gradation level (e.g., 255). Here, the corrected luminance value calculation unit 121*b* may determine a first ACL step (N1) and a second ACL step (N2) that correspond to the first OPR OPR1(n−1) of the previous frame and the second OPR OPR2(n−1) of the previous frame, respectively.

Further, the corrected luminance value calculation unit 121*b* may calculate a first corrected luminance value ACL-DYi(n−1) of the previous frame that is applied to the first display region 110*a* and a second corrected luminance value ACL-DY2(n−1) of the previous frame that is applied to the second display region 110*b* through application of the first ACL step (N1) and the second ACL step (N2) to Equation 1 below.

$$ACL-DY1 = ACLom1 \times \frac{N1 - ACLss}{255 - ACLss}$$
$$ACL-DY2 = ACLom2 \times \frac{N2 - ACLss}{255 - ACLss}$$
Equation 1

In the above equation 1, ACLss refers to a reference gradation level, and ACLom1 and ACLom2 refer to the highest gradation level of an output image.

The first corrected luminance value ACL-DY1 may be a corrected luminance value that is applied to the first display region 110*a*, and the second corrected luminance value ACL-DY2 may be a corrected luminance value that is applied to the second display region 110*b*. The degrees of decrease in output image luminance due to the correction may differ from each other as shown in FIG. 9.

Here, the maximum gradation level ACLom1 of the first output image that is applied to the first corrected luminance value ACL-DY1 may be equal to the maximum gradation level ACLom2 of the second output image that is applied to the second corrected luminance value ACL-DY2, but the present invention is not limited thereto. For example, the maximum gradation level ACLom2 of the second output image may be lower than the maximum gradation level ACLom1 of the first output image. The maximum gradation levels may be determined (e.g., set) in consideration of the characteristics of the second region 110*b*.

That is, the display device 100 according to this embodiment may not calculate the OPR as the whole display unit 110, but may separately calculate the OPR in consideration of the characteristics of the respective display regions to set respective luminance decrease ratios. Accordingly, the power consumption can be reduced more effectively.

The corrected luminance value calculation unit 121*b* may output a first corrected luminance value ACL-DY1(n−1) of the previous frame and a second corrected luminance value ACL-DY2(n−1) of the previous frame to the corrected video data calculation unit 121*c*.

The corrected video data calculation unit 121*c* may receive the video data DATA(n) of the current frame, the first corrected luminance value ACL-DY1(n−1) of the previous frame, and the second corrected luminance value ACL-DY2 (n−1) of the previous frame. The corrected video data calculation unit 121*c* may generate first corrected video data DATA1' and second corrected video data DATA2' through correction of first video data DATA1 that corresponds to the first display region 110*a* and second video data DATA2 that corresponds to the second display region 110*b* among the video data DATA by Equation 2 below.

$$DATA1' = \frac{1 - ACL - DY1}{256} \times DATA1$$
$$DATA2' = \frac{1 - ACL - DY2}{256} \times DATA2$$
Equation 2

In the above equation 2, ACL-DY1 refers to the first corrected luminance value, and ACL-DY2 refers to the second corrected luminance value.

That is, the luminance values of all pixels PX included in the first region 110*a* may be decreased on the basis of the first corrected luminance value ACL-DY1. The luminance values of all pixels PX included in the second region 110*b* may be decreased on the basis of the second corrected luminance value ACL-DY2. Accordingly, the output image luminance of the first region 110*a* that displays corrected data may be different from the output image luminance of the second region 110*b*.

In this embodiment, the video data DATA(n) of the current frame is corrected by the corrected luminance value ACL-DY(n−1) of the previous frame. However, this is provided as an example, and the correction method is not limited thereto. For example, in another embodiment, the video data DATA(n) of the current frame may be corrected by the corrected luminance value ACL-DY(n) of the current frame that is generated on the basis of the OPR OPR(n) of the current frame.

The corrected video data calculation unit 121*c* may output corrected video data DATA' that includes first corrected video data DATA1' and second corrected video data DATA2' to the data driving unit 130.

Referring again to FIG. 1, the data driving unit 130 may receive the data control signal DCS and the corrected video data DATA' from the control unit 120. The data driving unit 130 may output a plurality of data voltages D1 to Dm to the display unit 110 based on the data control signal DCS and the corrected video data DATA'. For example, the data voltages D1 to Dk that correspond to the first corrected video data DATA1' may be output to the first region 110*a*, and the data voltages Dk+1 to Dm that correspond to the second corrected video data DATA2' may be output to the second region 110*b*.

The scan driving unit 140 may receive the scan control signal SCS from the control unit 120. The scan driving unit 140 may output and provide the plurality of scan signals S1 to Sn to the display unit 110 corresponding to the received scan control signal SCS. The plurality of scan signals S1 to Sn may be sequentially applied (e.g., successively applied), but the present invention is not limited thereto. The scan driving unit 140 may select pixels PX to which the data voltages are to be provided by supplying the plurality of scan signals S1 to Sn to the scan lines SL1 to SLn.

Hereinafter, an organic light emitting display device according to another embodiment of the present invention will be described.

Figure 10:
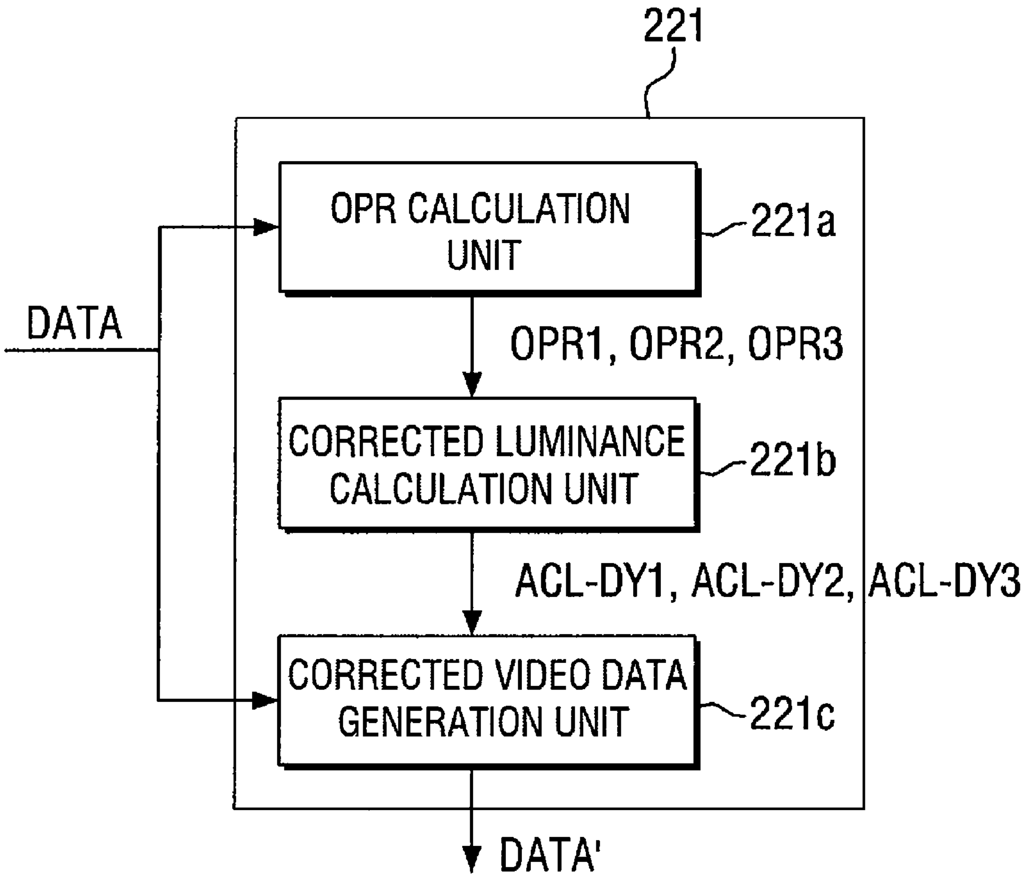
FIG. 10 is a block diagram of a data conversion unit according to another embodiment of the present invention.
Figure 11:
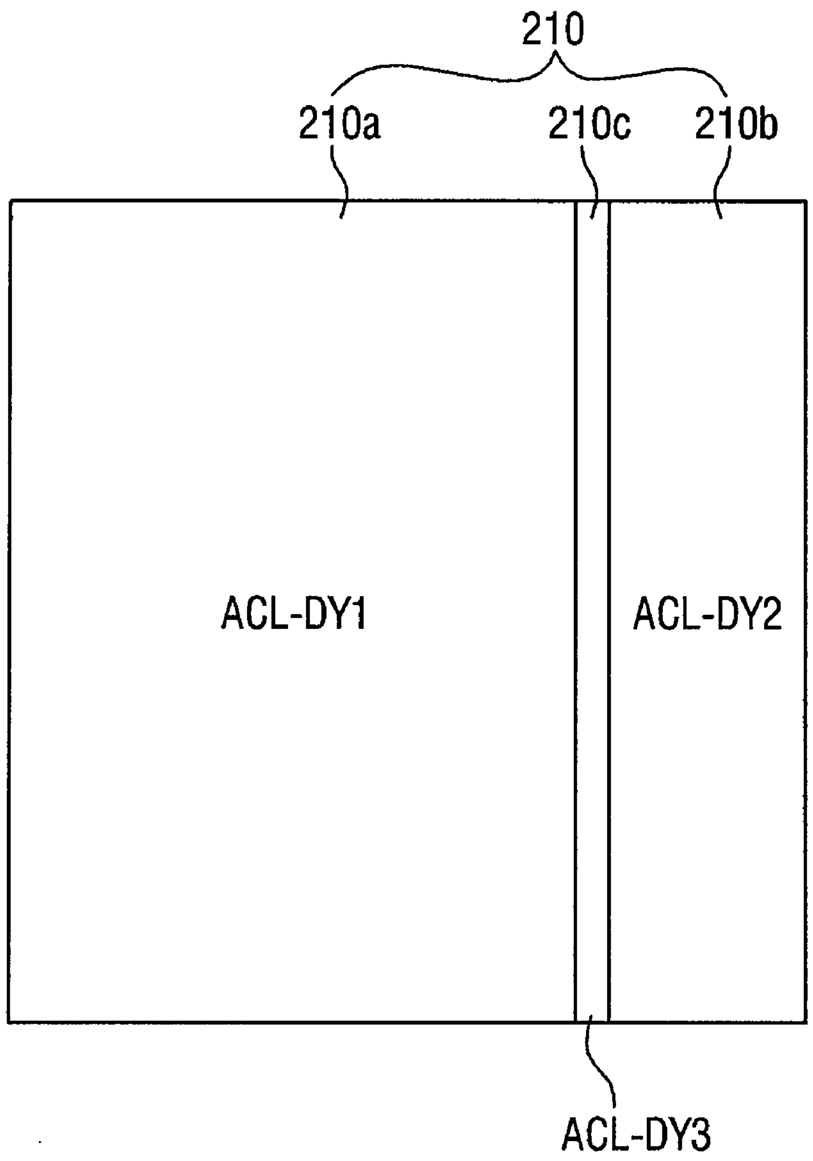
FIG. 11 is a schematic view of a display unit according to another embodiment of the present invention.

FIG. 10 is a block diagram of a data conversion unit according to another embodiment of the present invention and FIG. 11 is a schematic view of a display unit according to another embodiment of the present invention.

Referring to FIGS. 10 and 11, a control unit 221 (e.g., a controller) of an organic light emitting display device according to another embodiment of the present invention may output a third OPR OPR3 that is an average value between a first OPR OPR1 and a second OPR OPR2, and correct video data DATA that corresponds to a third display region 210*c*, that is a boundary region between a first display region 210*a* and a second display region 210*b*, using a third corrected luminance value ACL-DY3 that is calculated according to the third OPR OPR3 to generate corrected video data DATA'.

The control unit 221 may include an OPR calculation unit 221*a* (e.g., an OPR calculator), a corrected luminance value calculation unit 221*b* (e.g., a corrected luminance value calculator), and a corrected video data generation unit 221*c* (e.g., a corrected video data generator).

The OPR calculation unit 221*a* may calculate the first OPR OPR1, the second OPR OPR2, and the third OPR OPR3. Here, the third OPR OPR3 may be the average value between the first OPR OPR1 and the second OPR OPR2. That is, the OPR calculation unit 221*a* may calculate the first OPR OPR1 and the second OPR OPR2, and then calculate the third OPR OPR3 that corresponds to the average value. The OPR calculation unit 221*a* may output the first to third OPRs OPR1, OPR2, and OPR3 to the corrected luminance value calculation unit 221*b*.

The corrected luminance value calculation unit 221*b* may calculate first to third corrected luminance values ACL-DY1, ACL-DY2, and ACL-DY3 based on the first to third OPRs OPR1, OPR2, and OPR3. Here, the third corrected luminance value ACL-DY3 may be calculated through a method that is substantially the same as Equation 1 as described above. The corrected luminance value calculation unit 221*b* may output the calculated first to third corrected luminance values ACL-DY1, ACL-DY2, and ACL-DY3 to the corrected video data generation unit 221*c*.

The corrected video data generation unit 221*c* may correct the video data DATA that corresponds to the first to third display regions 210*a*, 210*b*, and 210*c* of the display unit 210 through a method that is substantially the same as Equation 2 as described above using the first to third corrected luminance values ACL-DY1, ACL-DY2, and ACL-DY3. Here, the third display region 210*c* may be the boundary region between the first display region 210*a* and the second display region 210*b*, and the first display region 210*a* and the second display region 210*b* may display different images. That is, the third display region 210*c* may be corrected using the third correction luminance value ACL-DY3 that is calculated on the basis of the third OPR OPR3 that is the average value between the first OPR OPR1 and the second OPR OPR2. The third region 210*c*, which is the boundary region that may be recognized when the first display region 210*a* and the second display region 210*b* display different images, may be corrected by the third corrected luminance value ACL-DY3 as described above, and thus may not be recognized by a user.

The organic light emitting display device according to this embodiment may effectively reduce the power consumption by separately applying automatic current limit (ACL) functions to the first display region 210*a* and the second display region 210*b*. In addition, the organic light emitting display device may correct the third display region 210*c* that corresponds to the boundary region with the third corrected luminance value ACL-DY3 calculated on the basis of the third OPR OPR3 that is the average value between the first OPR OPR1 and the second OPR OPR2 to prevent the boundary surface from being visually recognized.

Since the configuration of the organic light emitting display device according to this embodiment is substantially the same as the configuration of the organic light emitting display device 10 as shown in FIGS. 1 to 9, the description thereof will be omitted.

Hereinafter, an organic light emitting display device according to still another embodiment of the present invention will be described.

Figure 12:
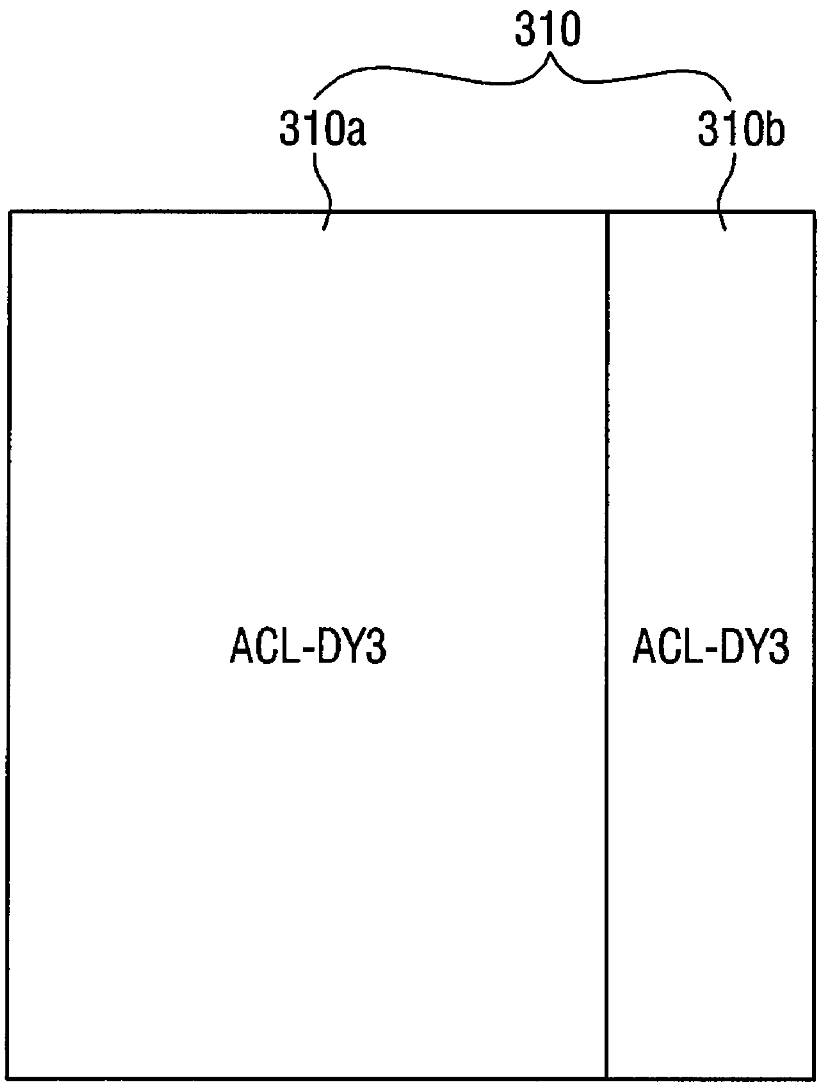
FIG. 12 is a schematic view of a display unit according to still another embodiment of the present invention.

FIG. 12 is a schematic view of a display unit according to still another embodiment of the present invention.

Referring to FIG. 12, a display unit 310 of an organic light emitting display device according to still another embodiment of the present invention includes a first display region 310*a* and a second display region 310*b*. Here, the first display region 310*a* and the second display region 310*b* may display one image in association with each other. A control unit (e.g., a controller) of the organic light emitting display device according to still another embodiment of the present invention may sense such a state through analysis of input video data DATA. The control unit may calculate a third OPR OPR3 that is an average value between a first OPR OPR1 and a second OPR OPR2, calculate a third corrected luminance value ACL-DY3 based on the third OPR OPR3, and correct the video data that correspond to the first display region 310*a* and the second display region 310*b* using the third corrected luminance value ACL-DY3 to generate corrected video data DATA'.

That is, in the case where the first display region 310*a* and the second display region 310*b* display a continuous image in association with each other, automatic current limit (ACL) correction may be performed with the third corrected luminance value ACL-DY3 in the first display region 310*a* and the second display region 310*b* to prevent or substantially prevent the boundary surface from being recognized.

Since the configuration of the organic light emitting display device according to this embodiment is substantially the same as the configuration of the organic light emitting display device 10 as shown in FIGS. 1 to 9, the description thereof will be omitted.

Figure 13:
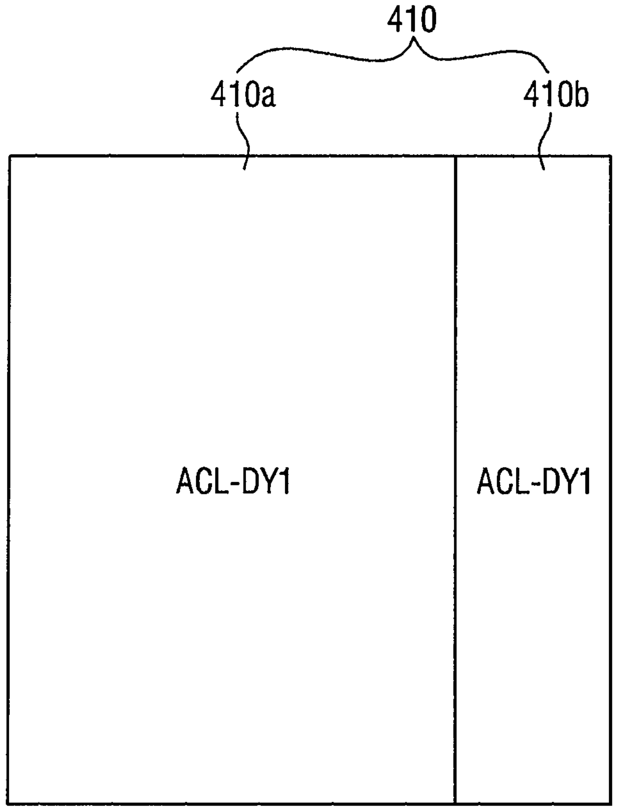
FIG. 13 is a schematic view of a display unit according to still another embodiment of the present invention.

FIG. 13 is a schematic view of a display unit according to still another embodiment of the present invention.

Referring to FIG. 13, a display unit 410 of an organic light emitting display device according to still another embodiment of the present invention includes a first display region 410*a* and a second display region 410*b*. Here, the first display region 410*a* and the second display region 410*b* may display one image in association with each other. However, content of a partial image that is displayed on the second display region 410*b* may have very low gradation, and thus the whole luminance of the second display region 410*b* that is calculated accordingly may become very low. A second OPR OPR2 may have a very low value. Accordingly, the degree of luminance decrease of the first region 410*a*, which is caused by a third corrected luminance value ACL-DY3 that is generated on the basis of a third OPR OPR3 according to the embodiment of FIG. 12 in the first display region 410*a* and the second display region 410*b*, may be smaller than the degree of luminance decrease of the first region 410*a* that is caused by the first corrected luminance value ACL-DY1.

Accordingly, in the case where the first display region 410*a* and the second display region 410*b* display one image in association with each other or the whole luminance of the second display region 410*b* is low, the control unit may correct video data DATA that corresponds to the first display region 410*a* and the second display region 410*b* using the first corrected luminance value that is calculated according to the first OPR OPR1 to generate corrected video data DATA'. Accordingly, the degree of the whole luminance decrease of the first display region 410*a* becomes high, and thus more effective ACL correction can be provided.

Since the configuration of the organic light emitting display device according to this embodiment is substantially the same as the configuration of the organic light emitting display device 10 as shown in FIGS. 1 to 9, the description thereof will be omitted.

Figure 14:
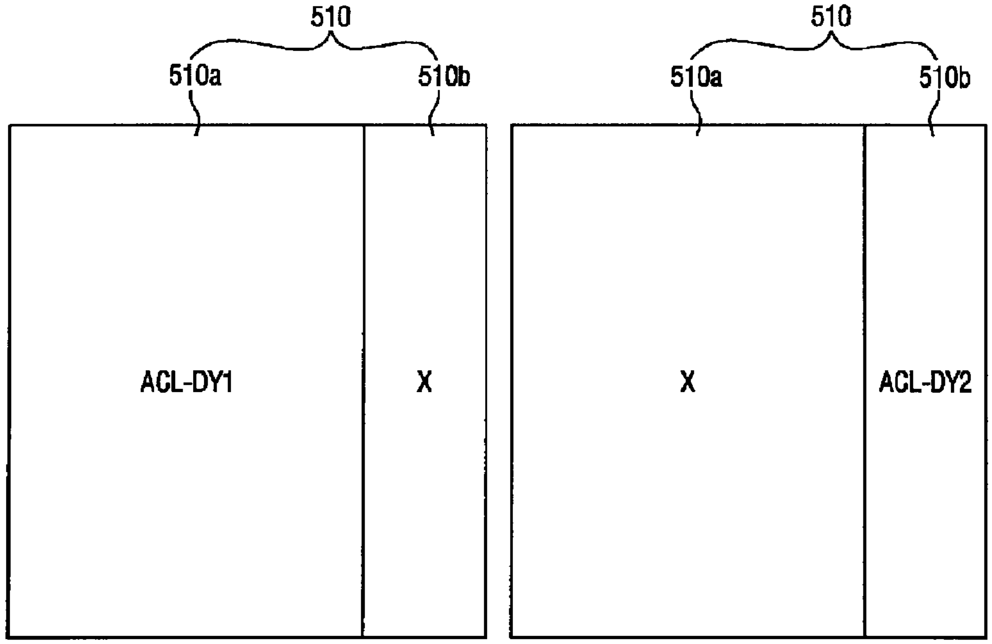
FIG. 14 is a schematic view of a display unit according to still another embodiment of the present invention.

FIG. 14 is a schematic view of a display unit according to still another embodiment of the present invention.

Referring to FIG. 14, a display unit 510 of an organic light emitting display device according to still another embodiment of the present invention includes a first display region 510*a* and a second display region 510*b*. In this case, an ACL correction may not be performed in the second display region 510*b*, but the ACL correction by a first corrected luminance value ACL-DY1 may be performed only in the first display region 510*a*. Further, the ACL correction may not be performed in the first display region 510*a*, but the ACL correction by a second corrected luminance value ACL-DY2 may be performed only in the second display region 510*b*.

A control unit (e.g., a controller) according to this embodiment analyzes video data DATA, and if the ACL correction is not necessary in the first display region 510*a*, the control unit may correct only the video data DATA that corresponds to the second display region 510*b* using the second corrected luminance value ACL-DY2 that is calculated according to a second OPR OPR2 to generate corrected video data DATA'. Further, the control unit according to this embodiment analyzes the video data DATA, and if the ACL correction is not necessary in the second display region 510*b*, the control unit may correct only the video data DATA that corresponds to the first display region 510*a* using a first corrected luminance value ACL-DY1 that is calculated according to a first OPR OPR1 to generate the corrected video data DATA'. The state where the ACL correction is not necessary is a preset state, and in this state, for example, only basic screen information may be displayed.

That is, the organic light emitting display device according to this embodiment may selectively provide the ACL correction to the first display region 510*a* or the second display region 510*b* according to the video data DATA.

Since the configuration of the organic light emitting display device according to this embodiment is substantially the same as the configuration of the organic light emitting display device 10 as shown in FIGS. 1 to 9, the description thereof will be omitted.

Hereinafter, a method for driving an organic light emitting display device according to an embodiment of the present invention will be described.

Figure 15:
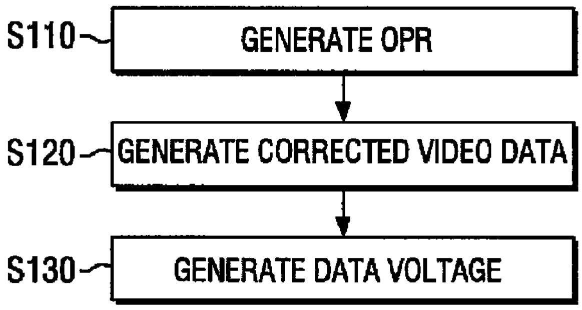
FIG. 15 is a flowchart illustrating a method for driving an organic light emitting display device according to an embodiment of the present invention.
Figure 16:
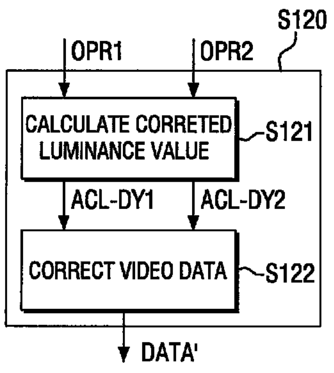
FIG. 16 is a block diagram of corrected video data processing.

FIG. 15 is a flowchart illustrating a method for driving an organic light emitting display device according to an embodiment of the present invention, and FIG. 16 is a block diagram of corrected video data processing.

Referring to FIGS. 15 and 16, a method for driving an organic light emitting display device according to an embodiment of the present invention includes driving the organic light emitting display device including a display unit having a plurality of pixels PX and defining a first display region and a second display region therein. The method for driving an organic light emitting display device includes generating an OPR (On Pixel Ratio) of the plurality of pixels from video data (S110), generating corrected video data for decreasing driving current of the plurality of pixels PX based on the OPR (S120), and generating data voltages (S130).

First, the OPR is generated (S110).

The OPR may include a first OPR OPR1 that corresponds to the first display region 110*a* and a second OPR OPR2 that corresponds to the second display region 110*b*. The description of the first display region 110*a* and the second display region 110*b* is substantially the same as the description of the organic light emitting display device 10 illustrated in FIGS. 1 to 9 and described above. Thus, the description thereof will be omitted.

A control unit 120 (e.g., a controller) of the organic light emitting display device may calculate the first OPR OPR1 from video data that corresponds to the first display region 110*a* and calculate the second OPR OPR2 from video data that corresponds to the second display region 110*b* among video data DATA input from an outside. The first OPR OPR1 may be the ratio of the number of pixels that are activated in an on state in the first display region 110*a* to the total number of pixels PX included in the first display region 110*a*. The second OPR OPR2 may be the ratio of the number of pixels that are activated in an on state in the second display region 110*b* to the total number of pixels PX included in the second display region 110*b*. Corrected video data may be generated on the basis of the first OPR OPR1 and the second OPR OPR2 calculated as above (S120).

Then, the corrected video data is generated (S120).

According to the method for driving an organic light emitting display device according to this embodiment, the corrected video data DATA' may be generated through correction of the video data DATA of the current frame based on the first OPR OPR1 and the second OPR OPR2 calculated as above, but the present invention is not limited thereto. In some embodiments, the corrected video data DATA' may be generated through correction of the video data DATA of the next frame based on the first OPR OPR1 and the second OPR OPR2 of the current frame.

The generating the corrected video data (S120) may include calculating the corrected luminance value based on the OPR (8121), and correcting the video data using a corrected luminance value (S122).

That is, a first ACL step (N1) and a second ACL step (N2) may be determined to correspond to the first OPR OPR1 and the second OPR OPR2, and a first corrected luminance value ACL-DY1 that is applied to the first display region 110*a* and a second corrected luminance value ACL-DY2 that is applied to the second display region 110*b* may be respectively calculated by applying the first ACL step (N1) and the second ACL step (N2) to Equation 1 (S121).

The video data DATA may be corrected by applying the first corrected luminance value ACL-DY1 and the second corrected luminance value ACL-DY2 calculated as above to Equation 2 (S122). That is, the first corrected video data DATA1' and the second corrected video data DATA2' may be generated by correcting the first video data DATA1 that corresponds to the first display region 110*a* and the second video data DATA2 that corresponds to the second display-region 110*b*. The corrected video data DATA' that includes the first corrected video data DATA1' and the second corrected video data DATA2' may be output to the data driving unit 130.

Here, the generating the corrected video data (8120) may correct the video data DATA to the corrected video data DATA' when the gradation level of the video data DATA is equal to or higher than a reference gradation level. That is, as for a low-luminance image, the power consumption reduction effect according to the luminance decrease is not high, but the deterioration of the display quality may be relatively large with respect to the luminance decrease. Accordingly, the corrected video data DATA' may be generated in the case where the gradation level of the video data DATA is equal to or higher than the reference gradation level ACLss.

Lastly, data voltages are generated (S130).

This will be described in detail with reference to FIG. 1. The data driving unit 130 may generate a plurality of data voltages D1 to Dm based on the data control signal DCS and the corrected video data DATA'. For example, the data voltages D1 to Dk that are output to the first region 110*a* may be generated on the basis of the first corrected video data DATA1', and the data voltages Dk+1 to Dm that are output to the second region 110*b* may be generated on the basis of the second corrected video data DATA2'.

In some embodiments, the generating the OPR (S130) may calculate a third OPR OPR3 that is an average value between the first OPR OPR1 and the second OPR OPR2, and the generating the corrected video data (S120) may correct the video data that corresponds to a third display region, that is a boundary region between the first display region and the second display region, using a third corrected luminance value calculated according to the third OPR OPR3 to generate the corrected video data. The first display region and the second display region may display different images, and the third region that is the recognizable boundary region may be corrected with the third corrected luminance value ACL-DY3, and thus, may not be recognized by a user.

In some embodiments, the generating the OPR (S110) may calculate the third OPR that is the average value between the first OPR OPR1 and the second OPR OPR2, and the generating the corrected video data (S120) may correct the video data that corresponds to the first display region and the second display region using the third corrected luminance value ACL-DY3 calculated according to the third OPR OPR3 to generate the corrected video data. Here, the first display region and the second display region may display one image in association with each other. That is, in the case where the first display region 310*a* and the second display region 310*b* display a continuous image in association with each other, automatic current limit (ACL) correction may be performed with the third corrected luminance value ACL-DY3 in the first display region 310*a* and the second display region 310*b* to prevent or substantially prevent the boundary surface from being recognized.

In some embodiments, the generating the corrected video data (S120) may correct the video data that corresponds to the first display region and the second display region using a first corrected luminance value ACL-DY1 calculated according to the first OPR OPR1 to generate the corrected video data. In this case, the first display region and the second display region may display one image in association with each other, but the whole luminance of the second display region 410*b* may be very low. In this case, the degree of luminance decrease becomes great to be effective in the case of performing the ACL correction only with the first corrected luminance value ACL-DY1 rather than in the case of performing the ACL correction with the third corrected luminance value ACL-DY3 that is an average value between the first corrected luminance value ACL-DY1 and the second corrected luminance value ACL-DY2.

Further, in some embodiments, the generating the corrected video data (S120) may correct only the video data that corresponds to the first display region using the first corrected luminance value ACL-DY1 calculated according to the first OPR OPR1 to generate the corrected video data. Further, the generating the corrected video data (S120) may correct only the video data that corresponds to the second display region using the second corrected luminance value ACL-DY2 calculated according to the second OPR OPR2 to generate the corrected video data. That is, if the ACL correction is not necessary in one region, the ACL correction may be selectively performed in the remaining region.

Although example embodiments of the present invention have been described for illustrative purposes, those skilled in the art will appreciate that various modifications, additions, and substitutions may be possible, without departing from the spirit and scope of the present invention as disclosed in the accompanying claims, and their equivalents.

What is claimed is:

1. An organic light emitting display device comprising:

a display unit having a first display region and a second display region, and comprising a plurality of pixels; and a controller configured to calculate an OPR (On Pixel Ratio) of the plurality of pixels from video data input from an outside, and to generate corrected video data for decreasing driving current of the plurality of pixels for each of the first display region and the second display region based on the OPR, the OPR comprising a first OPR that corresponds to the first display region and a second OPR that corresponds to the second display region, wherein the OPR is a ratio of the number of pixels that are activated in an on state to the total number of pixels based on one frame, and wherein the controller is configured to correct the video data that corresponds to the first display region utilizing a first corrected luminance value calculated according to the first OPR, and to correct the video data that corresponds to the second display region utilizing a second corrected luminance value calculated according to the second OPR.

2. The organic light emitting display device of claim 1, wherein the controller is configured to calculate a third OPR that is an average value between the first OPR and the second OPR, and to correct the video data that corresponds to a third display region that is a boundary region between the first display region and the second display region utilizing a third corrected luminance value calculated according to the third OPR.

3. The organic light emitting display device of claim 1, wherein the controller is configured to calculate a third OPR that is an average value between the first OPR and the second OPR, to calculate a third corrected luminance value based on the third OPR and to correct the video data that corresponds to the first display region and the second display region utilizing the third corrected luminance value.

4. The organic light emitting display device of claim 1, wherein the controller is configured to correct the video data that corresponds to the first display region and the second display region utilizing a first corrected luminance value calculated according to the first OPR.

5. The organic light emitting display device of claim 1, wherein the controller is configured to correct the video data that corresponds to the first display region utilizing a first corrected luminance value calculated according to the first OPR.

6. The organic light emitting display device of claim 1, wherein the controller is configured to correct the video data that corresponds to the second display region utilizing a second corrected luminance value calculated according to the second OPR.

7. The organic light emitting display device of claim 1, wherein the second display region extends from at least one side of the display region, and is bent with a curvature or is bent based on a boundary surface between the first display region and the second display region.

8. The organic light emitting display device of claim 1, wherein the controller is configured to generate the corrected video data from the video data when a gradation level of the video data is equal to or higher than a reference gradation level.

9. The organic light emitting display device of claim 1, wherein the controller comprises:

a data converter configured to convert the video data into the corrected video data, the data converter comprising an OPR calculator configured to calculate the first OPR and the second OPR that respectively correspond to the first display region and the second display region from the video data;

a corrected luminance value calculator configured to calculate a first corrected luminance value and a second corrected luminance value based on the first OPR and the second OPR, respectively; and a corrected video data generator configured to correct the video data to the corrected data utilizing the first corrected luminance value and the second corrected luminance value.

10. The organic light emitting display device of claim 1, wherein the controller is configured to calculate the OPR from the video data of a current frame, and to correct the video data of the current frame or the video data of a next frame based on the OPR.

11. A method for driving an organic light emitting display device comprising a display unit having a first display region and a second display region, and comprising a plurality of pixels, the method comprising:

generating an OPR (On Pixel Ratio) of the plurality of pixels from video data input from an outside, the OPR comprising a first OPR that corresponds to the first display region and a second OPR that corresponds to the second display region; and generating corrected video data for decreasing driving current of the plurality of pixels based on the OPR for each of the first display region and the second display region, wherein the OPR is a ratio of the number of pixels that are activated in an on state to the total number of pixels based on one frame, and wherein the generating of the corrected video data comprises correcting the video data that corresponds to the first display region utilizing a first corrected luminance value calculated according to the first OPR, and correcting the video data that corresponds to the second display region utilizing a second corrected luminance value calculated according to the second OPR to generate the corrected video data.

12. The method of claim 11, wherein the generating of the corrected video data comprises:

calculating a corrected luminance value based on the OPR; and correcting the video data to the corrected video data utilizing the corrected luminance value.

13. The method of claim 11, wherein the generating of the OPR comprises calculating a third OPR that is an average value between the first OPR and the second OPR, and wherein the generating of the corrected video data comprises correcting the video data that corresponds to a third display region that is a boundary region between the first display region and the second display region utilizing a third corrected luminance value calculated according to the third OPR to generate the corrected video data.

14. The method of claim 11, wherein the generating of the OPR comprises calculating a third OPR that is an average value between the first OPR and the second OPR, and wherein the generating of the corrected video data comprises correcting the video data that corresponds to the first display region and the second display region utilizing a third corrected luminance value calculated according to the third OPR to generate the corrected video data.

15. The method of claim 11, wherein the generating of the corrected video data comprises correcting the video data that corresponds to the first display region and the second display region utilizing a first corrected luminance value calculated according to the first OPR to generate the corrected video data.

16. The method of claim 11, wherein the generating of the corrected video data comprises correcting the video data that corresponds to the first display region utilizing a first corrected luminance value calculated according to the first OPR to generate the corrected video data.

17. The method of claim 11, wherein the generating of the corrected video data comprises correcting the video data that corresponds to the second display region utilizing a second corrected luminance value calculated according to the second OPR to generate the corrected video data.

18. The method of claim 11, wherein the generating of the corrected video data comprises generating the corrected video data from the video data when a gradation level of the video data is equal to or higher than a reference gradation level.

* * * * *